(12) United States Patent
Isono et al.

(10) Patent No.: US 8,869,559 B2
(45) Date of Patent: Oct. 28, 2014

(54) METHOD OF MANUFACTURING A GLASS SUBSTRATE FOR MAGNETIC DISK

(75) Inventors: Hideki Isono, Kofu (JP); Shinji Eda, Nirasaki (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 13/362,147

(22) Filed: Jan. 31, 2012

(65) Prior Publication Data

US 2013/0025320 A1 Jan. 31, 2013

Related U.S. Application Data

(60) Provisional application No. 61/437,937, filed on Jan. 31, 2011.

(51) Int. Cl.
*C03B 11/08* (2006.01)
*G11B 5/84* (2006.01)

(52) U.S. Cl.
CPC ........... *G11B 5/8404* (2013.01); *C03B 2215/70* (2013.01); *C03B 11/088* (2013.01)
USPC .................................. 65/61; 65/90

(58) Field of Classification Search
CPC .... C03B 2215/70; C03B 11/00; C03B 11/06; C03B 11/08; C03B 11/088
USPC .................. 65/70, 105, 61, 90, 112
See application file for complete search history.

(56) References Cited

U.S. PATENT DOCUMENTS

| | | | |
|---|---|---|---|
| 1,587,985 A | 6/1926 | Peiler | |
| 1,869,921 A | 8/1932 | Soubier | |
| 3,351,449 A | 11/1967 | Ambrogi | |
| 3,918,951 A | 11/1975 | Kitayama et al. | |
| 4,015,967 A | 4/1977 | Ward, Jr. | |
| 4,450,741 A | 5/1984 | Mumford | |
| 4,475,938 A | 10/1984 | Knoth | |
| 5,275,637 A * | 1/1994 | Sato et al. ......................... | 65/66 |
| 5,336,289 A | 8/1994 | Yeom et al. | |

(Continued)

FOREIGN PATENT DOCUMENTS

| | | |
|---|---|---|
| JP | 63-248727 A | 10/1988 |
| JP | 01-133948 A | 5/1989 |

(Continued)

OTHER PUBLICATIONS

International Search Report of corresponding International Application No. PCT/JP2011/001974, dated on Jul. 5, 2011.

(Continued)

*Primary Examiner* — Matthew Daniels
*Assistant Examiner* — Cynthia Szewczyk
(74) *Attorney, Agent, or Firm* — Global IP Counselors, LLP

(57) ABSTRACT

A manufacturing method of a glass substrate for magnetic disk including a pair of principal surfaces is disclosed The method includes the steps of: dropping process for dropping a lump in vertically downward direction, the lump made by cutting molten glass; pressing process for forming a sheet glass material by sandwiching substantially simultaneously the lump from both sides of the dropping path of the lump with surfaces of the pair of dies at the timing when at least a cut mark of the lump protrudes from a pair of dies facing together, and performing press forming to the lump; and removing process for removing the glass material protruding from the pair of dies.

10 Claims, 8 Drawing Sheets

(56) References Cited

U.S. PATENT DOCUMENTS

| | | |
|---|---|---|
| 5,588,979 A | 12/1996 | Miyazaki et al. |
| 5,588,980 A | 12/1996 | Ito |
| 5,766,293 A | 6/1998 | Gearing |
| 5,846,283 A | 12/1998 | Struckmeier et al. |
| 5,987,925 A | 11/1999 | Flynn |
| 6,442,975 B1 * | 9/2002 | Murakami et al. ............. 65/61 |
| 6,626,010 B1 | 9/2003 | Yoshida |
| 6,701,750 B2 | 3/2004 | Maeda et al. |
| 7,065,984 B2 | 6/2006 | Kezuka et al. |
| 7,313,930 B2 | 1/2008 | Kainuma et al. |
| 7,328,641 B2 | 2/2008 | Kawachi |
| 2001/0049031 A1 | 12/2001 | Bajorek et al. |
| 2003/0121286 A1* | 7/2003 | Takagi et al. ............... 65/64 |
| 2004/0194506 A1 | 10/2004 | Ueda et al. |
| 2004/0237592 A1 | 12/2004 | Iguchi et al. |
| 2005/0204777 A1 | 9/2005 | Mori et al. |
| 2006/0260361 A1 | 11/2006 | Yoshida et al. |
| 2007/0044515 A1 | 3/2007 | Pfeiffer |
| 2008/0104996 A1 | 5/2008 | Minazawa |
| 2009/0239035 A1 | 9/2009 | Nagai et al. |
| 2009/0255298 A1 | 10/2009 | Balbi |
| 2011/0135963 A1 | 6/2011 | Nagashima et al. |
| 2011/0283739 A1 | 11/2011 | Osawa et al. |
| 2012/0204601 A1 | 8/2012 | Murakami |

FOREIGN PATENT DOCUMENTS

| | | | |
|---|---|---|---|
| JP | 01-164738 A | | 6/1989 |
| JP | 01212238 A | * | 8/1989 |
| JP | 01-294543 A | | 11/1989 |
| JP | 06-171959 A | | 6/1994 |
| JP | 10-011748 A | | 1/1998 |
| JP | 3709033 B | | 7/1998 |
| JP | 10-203832-A A | | 8/1998 |
| JP | 11-228150 A | | 8/1999 |
| JP | 2002-097037 A | | 4/2002 |
| JP | 2003-030822 A | | 1/2003 |
| JP | 2003-054965 A | | 2/2003 |
| JP | 2003-128425 A | | 5/2003 |
| JP | 2004-196651 A | | 7/2004 |
| JP | 3709033 B2 | | 8/2005 |
| JP | 2005-263574 A | | 9/2005 |
| JP | 4380379 B | | 9/2005 |
| JP | 2008-105894 A | | 5/2008 |
| JP | 2008-174401 A | | 7/2008 |
| JP | 2008-254166 A | | 10/2008 |
| JP | 2008-273779 A | | 11/2008 |
| JP | 2009-099249 A | | 5/2009 |
| JP | 2009-211782 A | | 9/2009 |
| JP | 2009-269762 A | | 11/2009 |
| JP | 2011-207738 A | | 10/2011 |

OTHER PUBLICATIONS

Office Action of U.S. Appl. No. 13/313,593, dated Feb. 15, 2013.

* cited by examiner

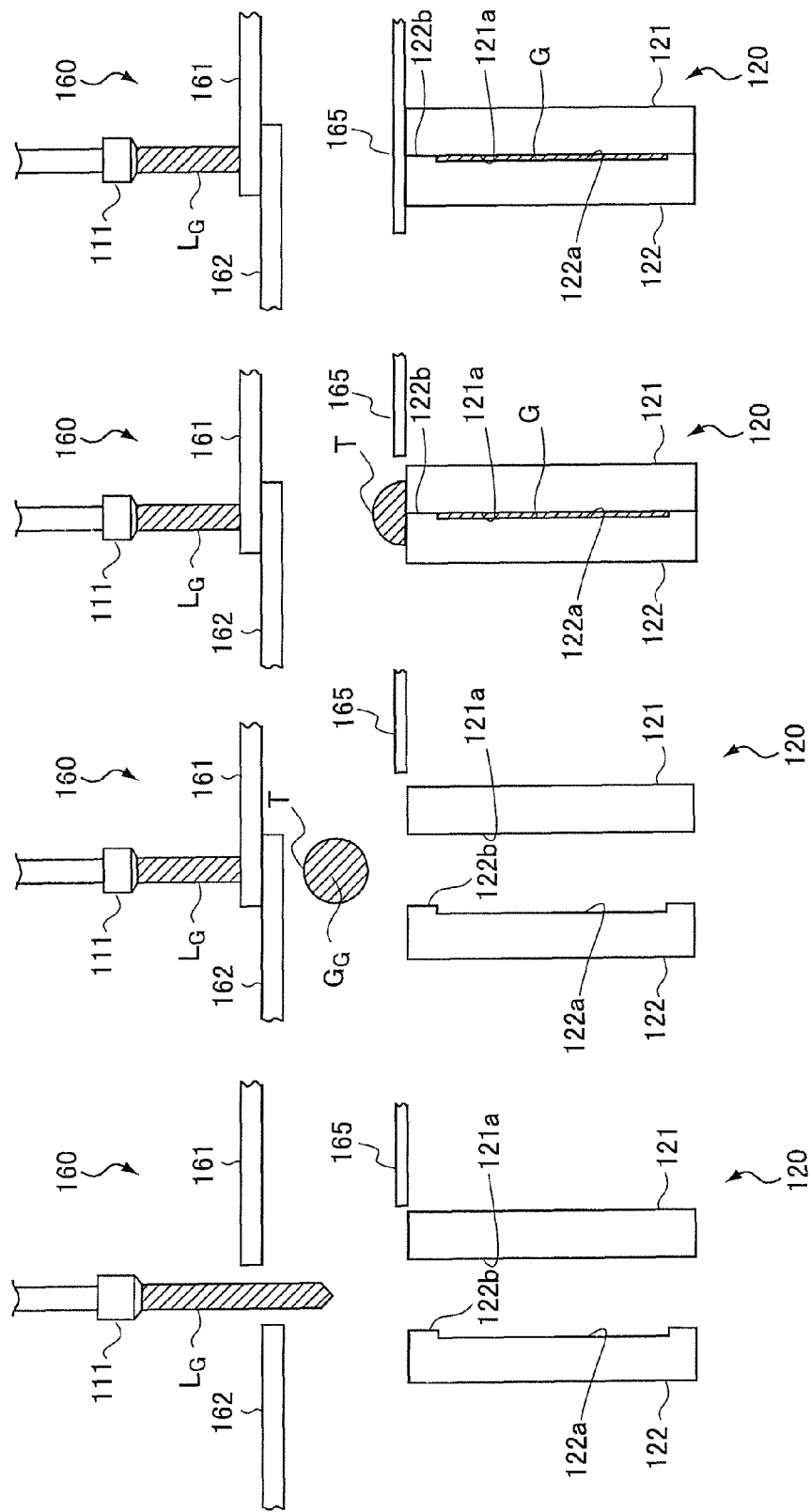

METHOD OF MANUFACTURING A GLASS SUBSTRATE FOR MAGNETIC DISK

CROSS-REFERENCE TO RELATED APPLICATION

This application is based upon and claims the benefit of priority of the U.S. Provisional Application No. 61/437,937 filed in the US Patent and Trademark Office on Jan. 31, 2011, the entire contents of which are incorporated herein by reference.

FIELD

The present invention relates to a manufacturing method of a glass substrate for magnetic disk having a pair of principal surfaces.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because a glass substrate is hardly plastically deformed compared with a metallic substrate.

The magnetic recording density is being increased in order to respond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in a single disk substrate. In order to respond to the further increase of the storage capacity, a floating distance of the magnetic head from the magnetic recording surface is extremely shortened to form the fine magnetic recording information area. With such substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are caused by the micro irregularity or a particle on the magnetic disk surface, the glass substrate is formed such that the surface irregularity of an end face is also decreased as much as possible in addition to that of the principal surface.

For example, the glass substrate used in the magnetic disk is manufactured by the following method: specifically, a glass gob made of molten glass (a lump of the glass material) is supplied onto a lower die that is a backing gob forming die; press forming is performed to the glass gob to prepare a sheet glass material using the lower die and an upper die that is a counter gob forming die; and the sheet glass material is formed into a glass substrate for information recording medium (for example, see Japanese Patent No. 3709033).

With the method disclosed in the Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained after a grinding process and a polishing process.

Generally, when forming a gob of molten glass by cutting molten glass with a cutting blade, a portion of the molten glass that contacts the cutting blade is rapidly cooled, thereby forming a cut mark thereon. When press forming a gob including a cut mark, a sheer mark that originates from the cut mark is formed on a sheet glass material. The sheer mark may be observed as aggregate of small air bubbles or dents on the surface.

It should be note that, since two times cutting is required to form a single gob, there normally exists two cutting marks on a single gob, thereby forming two sheer marks accordingly. The cutting mark which is formed earlier may be dissolved again. The sheer mark that originates from the earlier-formed cut mark may be relatively smaller than the sheer mark that originates from the later-formed cut mark, or may be disappeared.

Remaining the sheer mark on a glass substrate for magnetic disk may not only impede read and write of magnetic data, but fail a hard disk drive device due to the contact between a head and the magnetic disk. Thus, it is required to grind and polish the glass substrate so deeply that the sheer mark is surely removed, thereby reducing efficiency of manufacturing of the glass substrate for magnetic disk. In the conventional press forming with an upper die and a lower die, the sheer mark is formed almost in the center of the sheet glass material after the forming, and amount of grinding or polishing may be inevitably greater.

In view of the above, an object of the present invention is to provide a manufacturing method for efficiently manufacturing a glass substrate for magnetic disk while suppressing defects on the principal surface thereof.

SUMMARY OF THE INVENTION

In order to solve the above problem, manufacturing method of a glass substrate for magnetic disk according to the present invention is a manufacturing method of a glass substrate for magnetic disk including a pair of principal surfaces, the method comprising the steps of: dropping process for dropping a lump in vertically downward direction, the lump made by cutting molten glass; pressing process for forming a sheet glass material by sandwiching substantially simultaneously the lump from both sides of the dropping path of the lump with surfaces of the pair of dies at the timing when at least a cut mark of the lump protrudes from a pair of dies facing together, and performing press forming to the lump; and removing process for removing the glass material protruding from the pair of dies.

Another manufacturing method of a glass substrate for magnetic disk according to the present invention is a manufacturing method of a glass substrate for magnetic disk including a pair of principal surfaces, the method comprising the steps of: providing process for providing molten glass in vertically downward direction; cutting process for moving a pair of dies facing together such that upper portions of the pair of dies contact to cut the molten glass and to form a lump of molten glass; and pressing process for forming a sheet glass material by sandwiching the lump with surfaces of the pair of dies, and performing press forming to the lump, while maintaining the condition in which the upper portions of the pair of dies contact.

Preferably, the above manufacturing method of a glass substrate for magnetic disk includes the step of machining process for machining the sheet glass material, wherein the processing process includes grinding process for grinding the principal surfaces using fixed abrasive grains, and polishing process for polishing the principal surfaces using loose abrasive grains, and wherein total stock removal in the grinding process and the polishing process is 4 μm to 100 μm.

BRIEF DESCRIPTION OF THE DRAWINGS

Referring now to the attached drawings which form a part of this original disclosure:

FIG. 4A is a side view illustrating an arrangement before the molten glass and a cutting unit contact;

FIG. 4B is a side view illustrating an arrangement after the cutting unit cut the molten glass;

FIG. 4C is a side view illustrating an arrangement when a pressing unit performs press forming for a lump of the molten glass;

FIG. 4D is a side view illustrating an arrangement when a removing element removes glass material that protrudes from the pressing unit;

DESCRIPTION OF THE PREFERRED EMBODIMENTS

First Embodiment

A manufacturing method of a glass substrate for magnetic disk according to the present invention will be described in detail below.

(Magnetic Disk and Glass Substrate for Magnetic Disk)

Figure 1A:
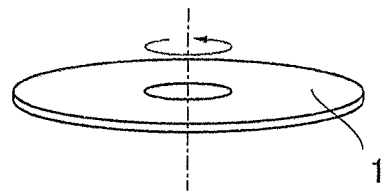
FIG. 1A is a view illustrating a magnetic disk prepared using a glass substrate for magnetic disk according to an embodiment of the invention.
Figure 1B:
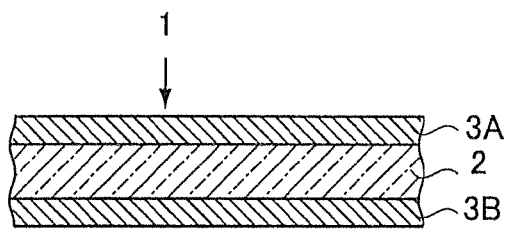
FIG. 1B is a view illustrating a section of the magnetic disk.
Figure 1C:
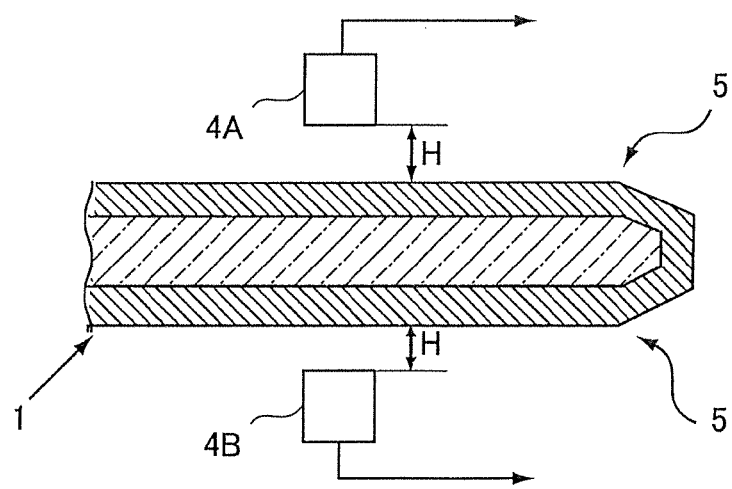
FIG. 1C is a view illustrating an arrangement in which a magnetic head is floated above the surface of the magnetic disk.

Referring now to FIG. 1A to FIG. 1C, a magnetic disk manufactured using a glass substrate for magnetic disk will be explained. FIG. 1A is a view illustrating a magnetic disk prepared using a glass substrate for magnetic disk according to an embodiment of the invention. FIG. 1B is a view illustrating a section of the magnetic disk. FIG. 1C is a view illustrating an arrangement in which a magnetic head is floated above the surface of the magnetic disk.

As illustrated in FIG. 1A, a magnetic disk 1 is a ring-shaped, and is driven around its axis of rotation. As illustrated in FIG. 1B, the magnetic disk 1 has a glass substrate 2 and at least magnetic layers 3A, 3B.

Note that, except the magnetic layers 3A, 3B, although not illustrated, an adhesive layer, a soft magnetic layer, a non-magnetic underlying layer, the perpendicular magnetic recording layer, a protective layer, and a lubricant layer are deposited. For example, Cr alloy is applied for the adhesive layer, and the adhesive layer acts as a bonding layer to the glass substrate 2. For example, CoTaZr alloy is applied for the soft magnetic layer. For example, Ru alloy is applied for the non-magnetic underlying layer. A granular magnetic layer is applied for the perpendicular magnetic recording layer. For example, material containing carbon hydride is applied for the protective layer. Fluorine resin is applied for the lubricant layer, for example.

The magnetic disk 1 will be described with a more specific example. A CrTi adhesive layer, a CoTaZr/Ru/CoTaZr soft magnetic layer, a Ru underlying layer, a CoCrPt—$SiO_2$.$TiO_2$ granular magnetic layer, and a carbon hydride protective layer are sequentially deposited in both the principal surfaces of the glass substrate 2 with a sputtering apparatus. A perfluoropolyether lubricant layer is then deposited on the uppermost layer by a dipping method.

When used in a hard disk device, the magnetic disk 1 rotates around the axis of rotation with rotation speed of 7,200 rpm for example. As illustrated in FIG. 1C, magnetic heads 4A and 4B of a hard disk device float from surfaces of the magnetic disk 1 by a distance H because of the high speed rotation of the magnetic disk 1. The distance H is 5 nm for example. At this point, the magnetic heads 4A and 4B record and read pieces of information in and from the magnetic layers. With the floating of the magnetic heads 4A and 4B, they record and read the information in and from the magnetic layer of the magnetic disk 1 at a short distance without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can be therefore precisely operated while the distance H of 5 nm is maintained.

Regarding surface irregularity of the principal surface of the glass substrate 2 used in the magnetic disk 1, flatness is 4 μm or less, and surface roughness is 0.2 nm or less. The flatness of 4 μm or less is target flatness required for the glass substrate for magnetic disk as a final product.

The flatness can be measured with a flatness tester FT-900 manufactured by NIDEK CO., LTD. for example.

The roughness of the principal surface Ra may be arithmetic average roughness Ra obtained with a scanning probe microscope (atomic force microscope) manufactured by SII Nano Technology Inc by measuring an area of 1 μm×1 μm with resolution of 512×256 pixels.

As will be described later, such glass substrate for magnetic disk having the surface irregularity, in which the flatness of the principal surface is 4 μm or less for example and the roughness of the principal surface is 0.2 nm or less for example, may be obtained, after a press forming process, a grinding process, a first polishing process, and a second polishing process.

It should be noted that, with the press forming method according to the present specification, the flatness of the principal surface of 4 μm or less can be realized without the grinding and the polishing processes. In this case, because the surface roughness level has only to be met, amount of grinding or polishing may be greatly decreased. Generally the flatness is improved with grinding, while the surface roughness is improved with polishing. Thus, the polishing process may be omitted by applying the press forming method according to the present specification.

Aluminosilicate glass, soda-lime glass, and borosilicate glass can be used as a material for the glass substrate 2. Particularly, the aluminosilicate glass can be suitably used in that chemically strengthening can be performed and in that the glass substrate for magnetic disk excellent for the flatness of the principal surface and the strength of the substrate can be prepared.

Aluminosilicate glass is preferably used containing by molar percent of 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, $HfO_2$. A glass material containing by molar percent of 57 to 74% $SiO_2$, 0 to 2.8% $ZnO_2$, 3 to 15% $Al_2O_3$, 1 to 16% $Li_2O$, 4 to 14% $Na_2O$ as the aluminosilicate glass may be suitably used to perform chemically strengthening.

(Manufacturing Method of a Glass Substrate for Magnetic Disk)

Figure 2:
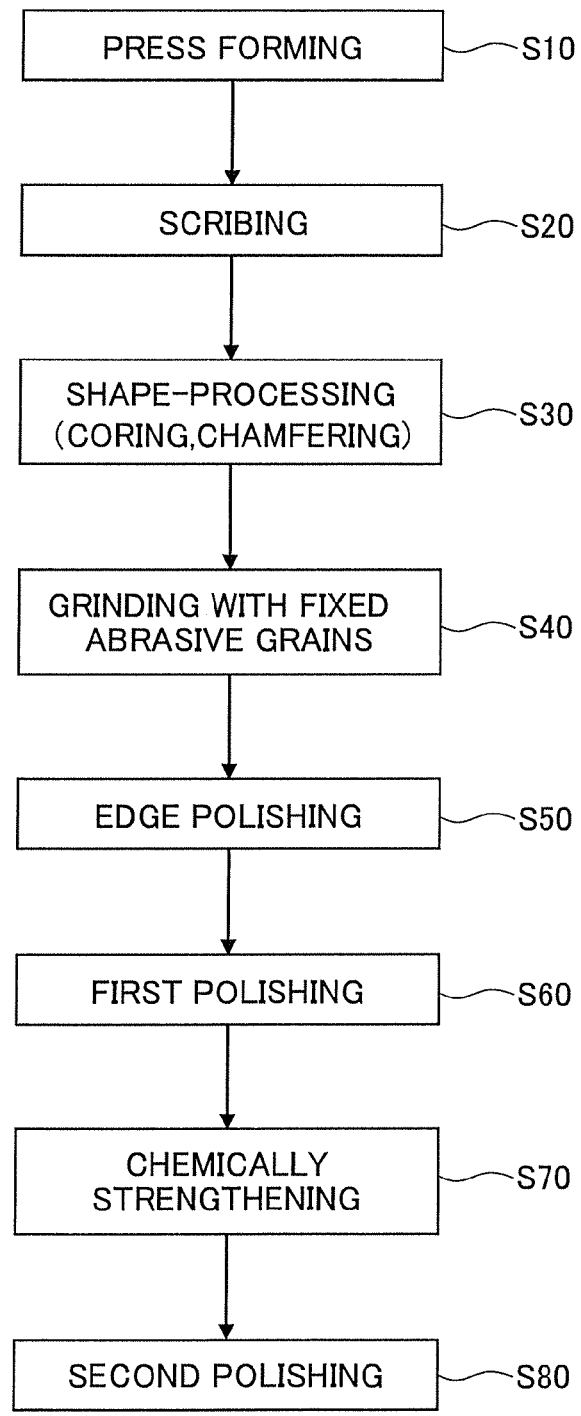
FIG. 2 is a view illustrating a flow of a manufacturing method of a glass substrate for magnetic disk according to an embodiment of the invention.

Next, with reference to FIG. 2, a flow of a manufacturing method of a glass substrate for magnetic disk will be explained. FIG. 2 is a view illustrating a flow of an embodiment of a manufacturing method of a glass substrate for magnetic disk.

As illustrated in FIG. 2, a sheet glass material is manufactured by the press forming (Step S10). Next, the formed sheet glass material is scribed (Step S20). Next, the scribed sheet glass material is shape-processed (Step S30). Next, grinding is performed to the sheet glass material using fixed abrasive grains (Step S40). Then, edge polishing is performed to the sheet glass material (Step S50). First polishing is performed to the principal surface of the sheet glass material (Step S60). Next, after the first polishing, the sheet glass material is chemically strengthened (Step S70). Then, the second polishing is performed to the chemically strengthened sheet glass material (Step S80).

The detail of each process will be explained below.

(a) Press Forming Process

Figure 3:
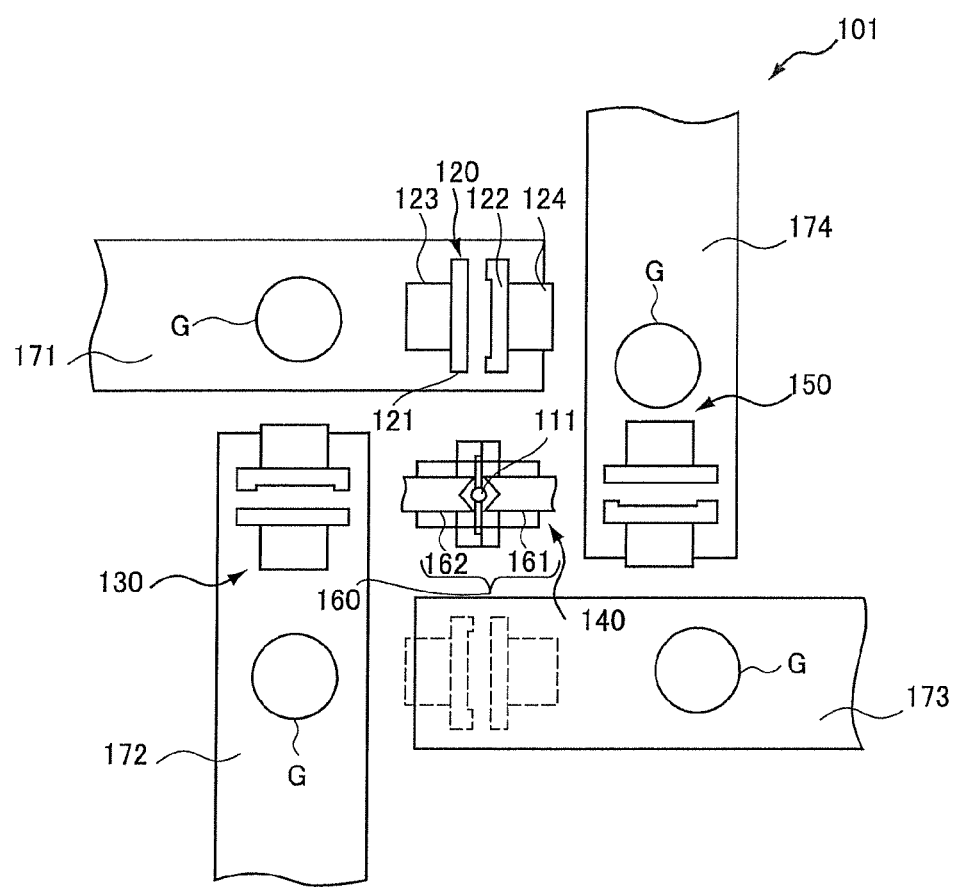
FIG. 3 is a plan view of an apparatus used in press forming.

Referring now to FIG. 3, the press forming process (Step S10) will be explained. FIG. 3 is a plan view of an apparatus used in press forming. As illustrated in FIG. 3, an apparatus 101 includes four sets of pressing units 120, 130, 140, and 150, a cutting unit 160, and a removing element 165 (not illustrated in FIG. 3).

The cutting unit 160 is provided on a path of the molten glass that flows out from a molten glass outflow port 111. A lump of the molten glass is cut by the cutting unit 160 to drop down in vertically downward direction. Each of the pressing units 120, 130, 140, and 150 sandwiches the lump of the molten glass from both sides of the dropping path of the lump with facing surfaces of a pair of dies at the same timing, thereby forming a sheet glass material.

In the example illustrated in FIG. 3, the four sets of pressing units 120, 130, 140, and 150 are provided at intervals of 90 degrees around the molten glass outflow port 111.

Each of the pressing units 120, 130, 140, and 150 is driven by a moving mechanism (not illustrated) so as to be able to proceed and retreat with respect to the molten glass outflow port 111. That is, each of the pressing units 120, 130, 140, and 150 can be moved between a catch position and a retreat position. The catch position (position where the pressing unit 140 is drawn by a solid line in FIG. 3) is located immediately below the molten glass outflow port 111. The retreat position (positions where the pressing units 120, 130, and 150 are drawn by solid lines in FIG. 3 and a position where the pressing units 140 is drawn by a broken line in FIG. 3) is located away from the molten glass outflow port 111.

The cutting unit 160 is provided on a path of the molten glass between the catch position and the molten glass outflow port 111. The cutting unit 160 cuts the molten glass flowing out from the molten glass outflow port 111 to obtain a proper quantity of the lump of the molten glass (hereinafter also referred to as "gob"). The cutting unit 160 includes a first cutting blade 161 and a second cutting blade 162. The first cutting blade 161 and the second cutting blade 162 are driven so as to intersect each other on the path of the molten glass at constant timing. When the first cutting blade 161 and the second cutting blade 162 intersect each other, the molten glass is cut to obtain the gob. The obtained gob drops down toward the catch position.

The pressing unit 120 includes a first die 121, a second die 122, a first driving unit 123, and a second driving unit 124.

Each of the first die 121 and the second die 122 is a plate-shaped member including a surface used to perform the press forming to the gob. The first die 121 and the second die 122 are disposed such that normal directions of the surfaces become substantially horizontal, and such that the surfaces become parallel to each other.

The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other. Each of the first driving unit 123 and the second driving unit 124 is, for example, a mechanism in which an air cylinder, a solenoid and a coil spring are combined.

Because each structure of the pressing units 130, 140, and 150 is similar to that of the pressing unit 120, the descriptions of the pressing units 130, 140, and 150 are omitted.

After each pressing unit moves to the catch position, the dropping gob is sandwiched between the first die and the second die by driving the first driving unit and the second driving unit, and the gob is formed into a predetermined thickness while rapidly cooled, thereby preparing the disk-shaped sheet glass material G. Then, after the pressing unit moves to the retreat position, the first die and the second die are separated to cause the formed sheet glass material G to drop down.

A first conveyer 171, a second conveyer 172, a third conveyer 173, and a fourth conveyer 174 are provided below the retreat positions of the pressing units 120, 130, 140, and 150, respectively. Each of the first to fourth conveyers 171 to 174 receives the sheet glass material G that drops down from the corresponding pressing unit, and the conveyer conveys the sheet glass material G to an apparatus (not illustrated) of the next process.

In the present embodiment, the apparatus 101 is configured such that the pressing units 120, 130, 140, and 150 sequentially move to the catch position and move to the retreat position while the gob is sandwiched. Thus, the sheet glass material G can continuously be formed without waiting for the cooling of the sheet glass material G in each pressing unit.

Note that the sheet glass material G may be continuously be formed by sandwiching the gob by use of a single pressing unit 120. In this case, the first die 121 and the second die 122 are opened immediately after the press forming of the gob $G_G$, and press forms the subsequently dropping lump of the molten glass.

Here, referring to the side views illustrated in FIGS. 4A to 4D, the press forming process according to the present embodiment will be explained. FIG. 4A is a side view illustrating an arrangement before a molten glass material $L_G$ and a cutting unit 160 contact. FIG. 4B is a side view illustrating an arrangement after the cutting unit 160 cut the molten glass material $L_G$. FIG. 4C is a side view illustrating an arrangement when a pressing unit 120 performs press forming for a lump $G_G$ of the molten glass. FIG. 4D is a side view illustrating an arrangement when a removing element removes glass material that protrudes from the pressing unit.

The removing element 165 is, for example, a blade for cutting the glass material that is cooled while protruding from the pressing unit 120. As illustrated in FIGS. 4A to 4D, the removing element 165 is provided around the top surface of the pressing unit 120. The removing element 165 can move in the horizontal direction on the top surface of the pressing unit 120. The removing element 165 can therefore remove the glass material that protrudes from the pressing unit 120 as explained later.

As illustrated in FIG. 4A, a molten glass material $L_G$ continuously flows out from the molten glass outflow port 111. As illustrated in FIG. 4B, the cutting unit 160 is driven at predetermined timing to cut the molten glass material $L_G$ using the cutting blades 161 and 162. Then, the cut molten glass becomes a substantially spherical gob $G_G$ due to a surface tension thereof. In the example illustrated in FIG. 4B, an outflow quantity per time of the molten glass material $L_G$ and a driving interval of the cutting unit 160 are adjusted such that a gob $G_G$ having a diameter of about 15 mm is formed every time the cutting unit 160 is driven.

Note that, when cutting the molten glass material $L_G$ with the cutting unit 160, a portion of the molten glass material $L_G$ that contacts the cutting unit 160 is rapidly cooled. Then a cutting mark T is formed on the upper part of the gob $G_G$.

The first driving unit 123 and the second driving unit 124 are driven at the timing when a portion of the gob $G_G$ including the cutting mark T protrudes from the pressing unit. Then, as illustrated in FIG. 4C, a portion of the gob $G_G$ excluding the cutting mark T is captured (caught), while the cutting mark T protrudes from the pressing unit 120.

Next, as illustrated in FIG. 4D, the removing element 165 removes the glass material that protrudes from the pressing unit 120. It should be noted that the removing element 165 is not limited to the illustrated structure as long as it can remove the glass material that protrudes from the pressing unit 120.

A projected spacer 122b is provided in the inner circumferential surface 122a of the second die 122 in order to keep the gap constant between the inner circumferential surface 121a of the first die 121 and the inner circumferential surface 122a of the second die 122. The spacer 122b of the second die abuts on the inner circumferential surface 121a of the first die 121, whereby the gap between the inner circumferential surface 121a of the first die 121 and the inner circumferential surface 122a of the second die 122 is kept constant to form a disk-shaped space.

A temperature control mechanism (not illustrated) may be preferably provided in each of the first die 121 and second die 122. Temperatures at the first die 121 and second die 122 may be maintained lower than a glass transition temperature $T_G$ of the molten glass material $L_G$.

A time until the portion of the gob $G_G$ excluding the cutting mark T is completely confined between the first die 121 and the second die 122 after the gob $G_G$ comes into contact with the inner circumferential surface 121a of the first die 121 or the inner circumferential surface 122a of the second die 122, is as extremely short as about 0.06 second. Therefore, the portion of the gob $G_G$ excluding the cutting mark T is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G.

Note that, in the present embodiment, for example, the formed sheet glass material G is a disk-shaped plate having a diameter of 75 to 80 mm and a thickness of about 1 mm.

After the first die 121 and the second die 122 are closed, the pressing unit 120 quickly moves to the retreat position. Then, the other pressing unit 130 moves to the catch position, and performs the pressing to the gob $G_G$.

After the pressing unit 120 moves to the retreat position, the first die 121 and the second die 122 are kept closed until the sheet glass material G is sufficiently cooled (for example, until the sheet glass material G becomes at least a temperature below a yield point). Then, the first driving unit 123 and the second driving unit 124 are driven to separate the first die 121 and the second die 122, the sheet glass material G drops down from the pressing unit 120, and the conveyer 171 located below the pressing unit 120 receives the sheet glass material G (see FIG. 3).

In the present embodiment, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. This prevents the inner circumferential surface 121a of the first die 121 and the inner circumferential surface 122a of the second die 122 from being locally heated, and a deformation is therefore hardly generated in the inner circumferential surface 121a and the inner circumferential surface 122a.

Because the gob $G_G$ is formed into the disk shape before the heat transfers from the gob $G_G$ to the first die 121 and the second die 122, a temperature distribution of the formed molten glass becomes substantially even. Therefore, in cooling the molten glass, the shrinkage quantity of the glass material has the small distribution, and the large deformation is unlikely to occur. Accordingly, the flatness of the principal surface of the prepared sheet glass material G is improved compared with the sheet glass material prepared by the conventional press forming, and the target flatness of the principal surface necessary as the glass substrate for magnetic disk can be realized.

The surface roughness of the inner circumferential surface 121a and the surface roughness of the inner circumferential surface 122a can be adjusted such that the arithmetic average roughness Ra of the sheet glass material G becomes 0.01 µm to 10 µm, preferably 0.01 µm to 1 µm.

When press forming a gob $G_G$ including a cut mark, a sheer mark that originates from the cut mark T is formed on a sheet glass material. There is possibility that remaining the sheer mark on a glass substrate for magnetic disk impede read and write of magnetic data. Therefore, it is necessary that the sheer mark is surely removed in the later described grinding and polishing processes.

By contrast, in the present embodiment, the portion of the gob $G_G$ excluding the cutting mark T formed on the upper part of the gob $G_G$ is sandwiched by the first die 121 and the second die 122 at the timing when the portion of the gob $G_G$ including the cutting mark T protrudes from the pressing unit. Therefore, a sheer mark is not formed which originates from the cut mark T formed on the upper part of the sheet glass material prepared by the pressing unit 120. When the sheer mark is not formed on the sheet glass material G, machining allowance can be decreased in the later-described grinding and polishing processes. This does not only contribute to manufacturing efficiency but also suppress occurrence of cracks in the grinding and polishing processes.

(b) Scribing Process

Next, scribing process (Step 20) will be explained. After the press forming, scribing is performed to the formed sheet glass material G in the scribing process.

As used herein, the scribing means that two concentric (inside concentric and outside concentric) cutting-plane lines (scratch in the form of a line) are provided in the surface of the sheet glass material G with a scriber made of a super alloy or diamond particles in order to obtain the ring-shape of the formed sheet glass material G having a predetermined size. The sheet glass material G scribed into two-concentric-circle shape is partially heated, and a portion outside the outside concentric circle and a portion inside the inside concentric circle are removed utilizing a difference in thermal expansion of the sheet glass material G, thereby obtaining the ring-shaped sheet glass material.

Note that a sheet glass material may be processed to have an outer diameter and uniformity, the degree of which scribing is not required for, and the ring-shaped sheet glass material may be obtained by forming an inner hole with a coring machine (drill) to the above sheet glass material.

(c) Shape Processing Process (Chamfering Process)

Next, a shape processing process (Step S30) will be explained. Then shape processing is performed to the scribed sheet glass material G. The shape processing includes chamfering (chamfering of outer circumferential end portion and inner circumferential end portion).

The outer circumferential end portion and inner circumferential end portion of the ring-shaped sheet glass material G are chamfered using diamond abrasive grains.

(d) Grinding Process Using Fixed Abrasive Grains

Next, a grinding process using fixed abrasive grains (Step S40) will be explained. In the grinding process using fixed abrasive grains, grinding is performed to the ring-shaped sheet glass material G using the fixed abrasive grains. For example, in the grinding using the fixed abrasive grains, machining allowance is several µm to about 100 µm. For example, the fixed abrasive grains has the particle size of about 10 µm.

Figure 5A:
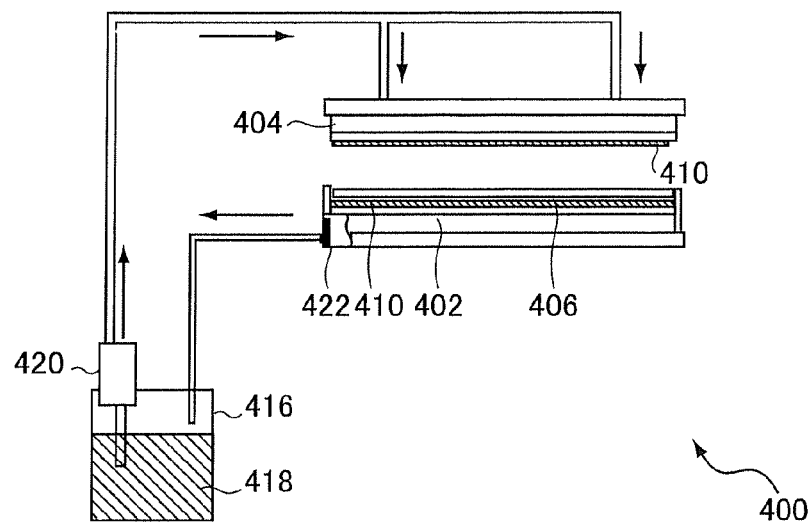
FIG. 5A is an overall view of an apparatus used to perform grinding using fixed abrasive grains.
Figure 5B:
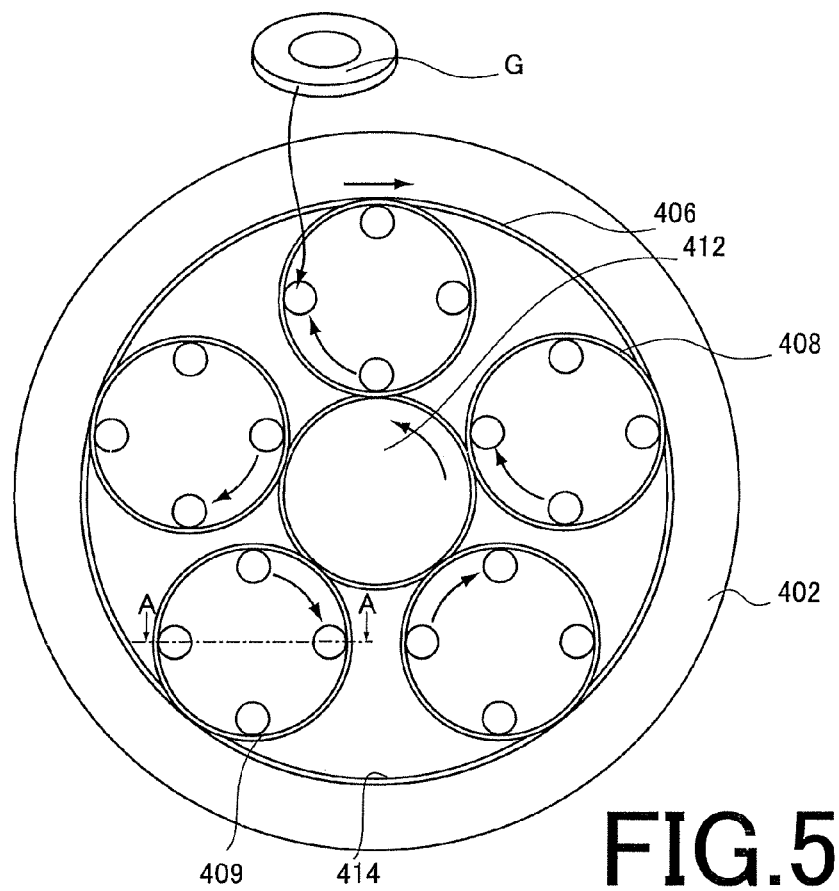
FIG. 5B is a view illustrating a carrier used in the apparatus of FIG. 5A.
Figure 6:
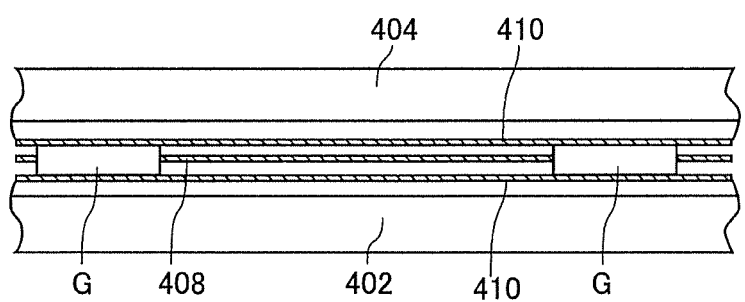
FIG. 6 is a view illustrating an arrangement in which a sheet glass material is ground.

Here, with reference to FIGS. 5A, 5B, and 6, the process for grinding the sheet glass material G will be explained. FIG. 5A is an overall view of an apparatus used to perform grinding using fixed abrasive grains. FIG. 5B is a view illustrating a carrier used in the apparatus of FIG. 5A. FIG. 6 is a view illustrating an arrangement in which a sheet glass material G is ground.

As illustrated in FIG. 5A and FIG. 6, an apparatus 400 includes a lower surface plate 402, an upper surface plate 404, an internal gear 406, a carrier 408, a diamond sheet 410, a sun gear 412, an internal gear 414, a reservoir 416, and a pump 420. The reservoir 416 includes coolant 418.

In the apparatus 400, the internal gear 406 is vertically sandwiched between the lower surface plate 402 and the upper surface plate 404. During the grinding, the plural carriers 408 are retained in the internal gear 406. In an example illustrated in FIG. 5B, the internal gear 406 retains the five carriers 408.

The surface of the diamond sheet 410 bonded to the lower surface plate 402 and the upper surface plate 404 in a planar manner constitutes a grinding surface. That is, the sheet glass material G is ground with the fixed abrasive grains using the diamond sheet 410.

As illustrated in FIG. 5B, the plural sheet glass materials G to be ground is retained while disposed in a circular hole provided in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in its outer circumference. The carrier 408 engages with the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 5A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

In the grinding apparatus 400, the grinding is performed using the diamond sheet 410. Alternatively, the fixed abrasive grains of the diamond particles may be used instead of the diamond sheet 410. For example, a pellet that is formed by binding the diamond particles with a resin can be used in the grinding using the fixed abrasive grains.

(e) Edge Polishing Process

Next, an edge polishing process (Step S50) will be explained. In the edge polishing process, edge polishing is performed to the sheet glass material G.

In the edge polishing, mirror surface finishing is performed to an inner-circumferential-side end face and an outer-circumferential-side end face of the sheet glass material. G by brush polishing. At this point, slurry that includes fine particles such as cerium oxide as the loose abrasive grains is used. The contamination of dust and damage such as a flaw are removed by performing the edge polishing. Therefore, generation of ions such as a sodium and potassium which cause corrosion can be prevented.

(f) First Polishing (Principal Surface Polishing) Process

Next, a first polishing process (Step S60) will be explained. In the first polishing process after the edge polishing process, the first polishing is performed to the ground principal surface of the sheet glass material G. For example, machining allowance in the first polishing is several μm to about 50 μm.

The first polishing is intended to remove the flaw left on the principal surface after the grinding using the fixed abrasive grains and the deformation. The apparatus 400 used in the grinding (Step S40) using the fixed abrasive grains is used in the first polishing. At this point, the first polishing differs from the grinding using the fixed abrasive grains in the following points. That is, in the first polishing process, the slurry of the turbid loose abrasive grains is used instead of the fixed abrasive grains. In the first polishing process, the coolant is not used. In the first polishing process, the resin polisher is used instead of the diamond sheet 410.

For example, the slurry of the turbid fine particles such as cerium oxide (particle size: diameter of about 1 μm to about 2 μm) is used as the loose abrasive grains used in the first polishing.

(g) Chemically Strengthening Process

Next, a chemically strengthening process (Step S70) will be explained. In the chemically strengthening process after the first polishing process, the first polished sheet glass material G is chemically strengthened.

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G.

The sheet glass material G to which the chemically strengthening treatment is performed is washed. For example, after washing the sheet glass material G using the sulfuric acid, the sheet glass material G is washed using pure water and IPA (isopropyl alcohol).

(h) Second Polishing (Final Polishing) Process

Next, a second polishing process (Step S80) will be explained. In the second polishing process, the second polishing is performed to the sheet glass material G after being chemically strengthened and well washed. For example, machining allowance in the second polishing is about 1 μm.

The second polishing is intended to perform mirror surface polishing to the principal surface. The apparatus 400 that is used in the grinding (Step S40) using the fixed abrasive grains and the first polishing (Step S60) is used in the second polishing. The second polishing differs from the first polishing in terms of the kind and particle size of the loose abrasive grains, and hardness of the resin polisher.

For example, the slurry of the turbid fine particles such as colloidal silica (particle size: diameter of about 0.1 μm) is used as the loose abrasive grains used in the second polishing.

The polished sheet glass material G is then washed. A neutral detergent, pure water, and IPA are used in the washing.

The glass substrate for magnetic disk 2 having the surface irregularity, in which the flatness of the principal surface is 4 μm or less and the roughness of the principal surface is 0.2 nm or less, is obtained by the second polishing.

Then, as illustrated in FIG. 1, the magnetic layers 3A and 3B are deposited to the glass substrate for magnetic disk 2 to prepare the magnetic disk 1.

The flow of the manufacturing method illustrated in FIG. 2 is described above. In the flow of FIG. 2, the scribing (Step S20) and the shape processing (Step S30) are performed between the grinding using the fixed abrasive grains (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grains (Step S40), the first polishing (Step S60), and the second polishing (Step S80) are performed in this order, the scribing (Step S20), the shape processing (Step S30), and the chemically strengthening (Step S70) may appropriately be reordered.

Second Embodiment

Next, a manufacturing method of a glass substrate for magnetic disk according to the second embodiment will be described. The manufacturing method of a glass substrate for magnetic disk according to the second embodiment differs from the above first embodiment in the press forming process. The other processes are the same as the above, and their explanations are therefore omitted.

Unlike the first embodiment, the apparatus 101 according to the present embodiment includes neither the cutting unit 160 nor the removing element 165. Further, in the present embodiment, the shape of the pressing unit and its action differ from those in the above first embodiment.

Figure 7A:
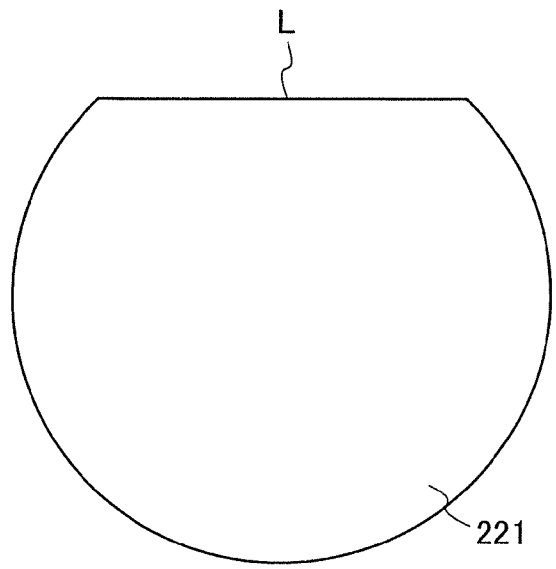
FIG. 7A is a plan view illustrating a die which a pressing unit according to the second embodiment includes.
Figure 7B:
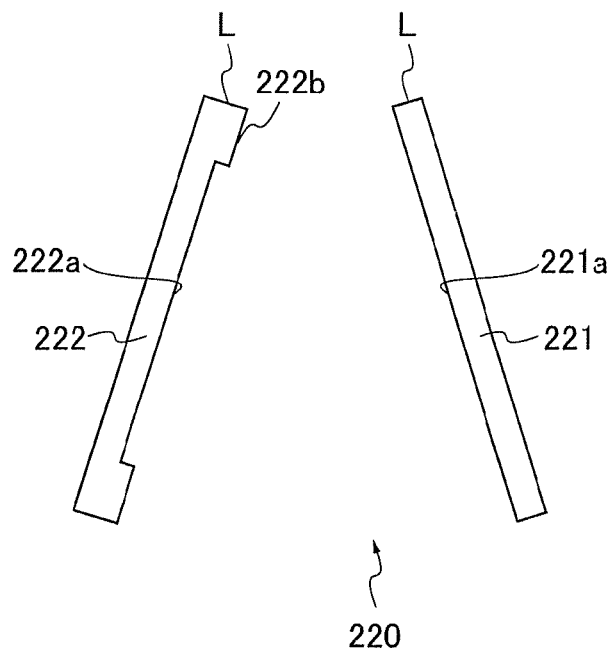
FIG. 7B is a side view illustrating the pressing unit according to the second embodiment includes.

First, with reference to FIGS. 7A and 7B, a pressing unit 220 according to the present embodiment will be explained. FIG. 7A is a plan view illustrating a first die 221 which the pressing unit 220 according to the present embodiment includes. FIG. 7B is a side view illustrating the pressing unit 220 according to the present embodiment includes.

As illustrated in FIG. 7A, the first die 221 according to the present embodiment has a substantially circular shape of which portion of arc is linearly cut. The first die 221 is located such that the straight line portion L, which linearly cuts the portion of arc, is positioned vertically upmost. Note that, though not illustrated in FIG. 7A, the plan view of the second die 222 is similar to that of the first die 221.

As illustrated in FIG. 7B, the first die 221 and the second die 222 are located such that, when opened, each of normal directions of the surfaces facing together for press forming a gob is slanting to the horizontal directions. Further, in order to keep a constant distance between an inner circumferential surface 221a of the first die 221 and an inner circumferential surface 222a of the second die 222, and to form a plate-like space inside the pressing unit 220 when closed, a projected spacer 222b is provided at the inner circumferential surface 222a of the second die 222.

Figure 8A:
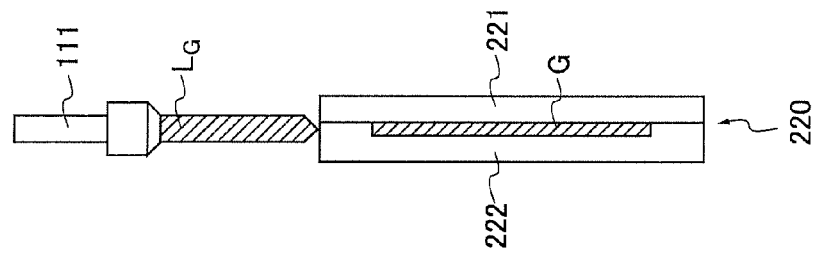
FIG. 8A is a side view illustrating an arrangement before the molten glass and a pressing unit contact.
Figure 8B:
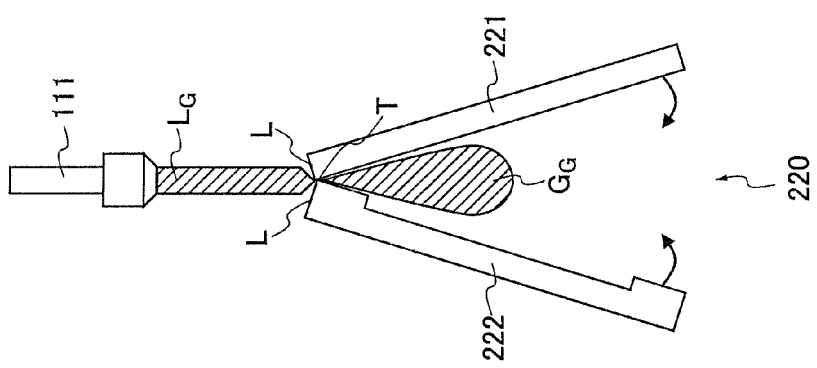
FIG. 8B is a side view illustrating an arrangement after the pressing unit cut the molten glass.
Figure 8C:
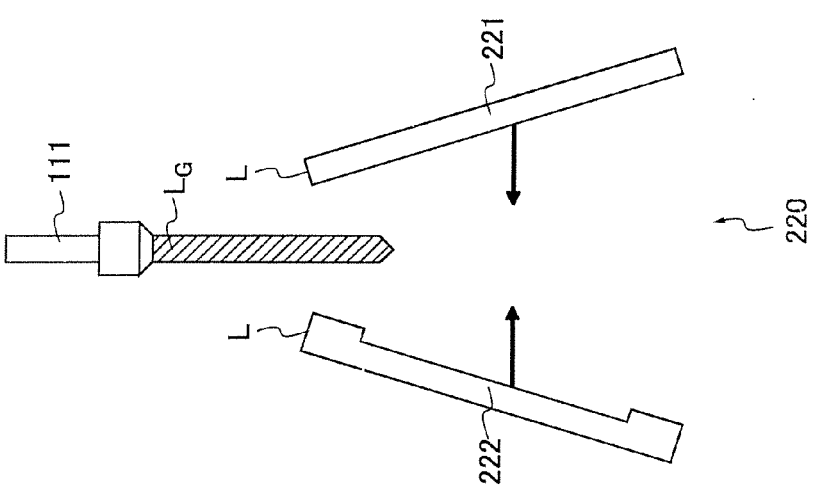
FIG. 8C is a side view illustrating an arrangement when the pressing unit performs press forming for a lump of the molten glass.

Referring now to the side view illustrated in FIGS. 8A to 8C, the press forming process according to the present embodiment will be explained. FIG. 8A is a side view illustrating an arrangement before the molten glass $L_G$ and a pressing unit contact. FIG. 8B is a side view illustrating an arrangement after the pressing unit cut the molten glass $L_G$. FIG. 8C is a side view illustrating an arrangement when the pressing unit performs press forming for a lump of the molten glass $L_G$.

As illustrated in FIG. 8A, the molten glass material $L_G$ continuously flows out from the molten glass outflow port 111. At this time, the first die 221 and the second die 222 respectively move in the horizontal direction as indicated with an arrow in FIG. 8A. By contacting the straight line portion L positioned at the top of the first die 221 and the straight line portion L positioned at the top of the first die 222 together, the molten glass material $L_G$ is cut, as illustrated in FIG. 8B. The molten glass material $L_G$ is cut, and a gob $G_G$ is then formed. At this time, a cut mark T is positioned around each straight line portions L.

As indicated with an arrow in FIG. 8B, the first die 221 and the second die 222 respectively move so as to close, while keeping the contact between the straight line portions L. This allow the gob $G_G$ to be captured (caught) between the first die 221 and the second die 222 and then to form a sheet glass material G, as illustrated in FIG. 8B.

According to the present embodiment, the gob $G_G$ is formed at the timing when the cut mark T, which is formed due to the contact of straight line portions L, is positioned around each straight line portions L. Thus, a sheer mark that originates from the cut mark T is formed around the circumference of the sheet glass material G.

The sheer mark, which is formed around the circumference of the sheet glass material G, is removed in the scribing process or the chamfering process. Consequently, machining allowance can be decreased in the grinding and polishing processes, and occurrence of cracks is suppressed in the grinding and polishing processes.

Further, time may be shortened from contact of straight line portions L until the first die 221 and the second die 222 close, and a sheer mark that originates from the cut mark T can be then formed more surely around the circumference of the sheet glass material G.

EXAMPLES

Simulations and experimental results will be explained below to verify the effect of the present inventions with reference to Examples and a Comparative Example.

Examples 1 to 3 and Comparative Example 1

Sheet glass materials G were manufactured through the press forming process according to the first embodiment that was explained with reference to FIG. 4. Examples 1 to 3 and Comparative Example 1 are different in length of portion protruding from the pressing unit 120 when the gob $G_G$ was captured between the first die 121 and the second die 122 as illustrated in FIG. 4C. The length of portion protruding from the pressing unit 120 was measured by photographing with a super high-speed camera. The length of portion protruding from the pressing unit 120 in each of the Examples 1 to 3 is as shown in the below table 1.

It should be note that, when the Comparative Example 1 was pressed, the cut mark T entered the space by 5 mm between the first die 221 and the second die 222, and did not protrude from the pressing unit 120.

The sheet glass materials G manufactured in the Examples 1 to 3 and the Comparative Example 1 were visually inspected and observed with a microscope to check whether or not a sheer mark that originates from the cut mark T which is formed at the upper part of the gob $G_G$ exists, and to check whether or not a sheer mark that originates from the cut mark T which is formed at the lower part of the gob $G_G$ exists. Further, when the sheer mark was formed, a position of the sheer mark was specified visually and with a microscope.

Then, the sheet glass materials G were divided at the position of the sheer mark in order to measure the maximum depth of the sheer mark.

Table 1 shows whether or not a sheer mark that originates from the cut mark T which is formed at the upper part of the gob $G_G$ exists, whether or not a sheer mark that originates from the cut mark T which is formed at the lower part of the gob $G_G$ exists, and measurement results of the maximum depth of the sheer mark.

TABLE 1

|  |  | Example 1 | Example 2 | Example 3 | Comparative Example 1 |
|---|---|---|---|---|---|
| Length of portion protruding (mm) |  | 5 | 3 | 2 | −5 |
| Sheer mark (originating from a cut mark on the upper part) | Exist/ Not exist | Not exist | Not exist | Not exist | Exist |
|  | Maximum depth (μm) | — | — | — | 150 |
| Sheer mark (originating from a cut mark on the lower part) | Exist/ Not exist | Exist | Exist | Exist | Exist |
|  | Maximum depth (μm) | 1.6 | 1.5 | 1.7 | 1.6 |

As shown in Table 1, it was confirmed that, by performing press forming at the timing when the cut mark T which is formed at the upper part of the gob $G_G$ protrudes, a sheer mark that originated from the cut mark T was not formed in the sheet glass materials G.

Note that, in each of the Examples 1 to 3, a sheer mark that originates from the cut mark T which is formed at the lower part of the gob $G_G$ was observed, and the maximum depth of this sheer mark was all 2 μm or less. The sheer mark of which maximum depth is 2 μm or less does not lead to a problem, because it can be removed in the polishing processes.

Examples 4 to 6

Sheet glass materials G were manufactured through the press forming process according to the second embodiment that was explained with reference to FIG. 8. Examples 4 to 6 are different in angle (initial angle) formed by the first die 221 and the second die 222 in a condition illustrated in FIG. 8A. In the Examples 4 to 6, angles formed by the first die 221 and the second die 222 are as shown in below Table 2.

The sheet glass materials G manufactured in the Examples 4 to 6 and the Comparative Example 1 were visually inspected and observed with a microscope to check whether or not a sheer mark that originates from the cut mark T which is formed at the upper part of the gob $G_G$ exists, and to check whether or not a sheer mark that originates from the cut mark T which is formed at the lower part of the gob $G_G$ exists. Further, when the sheer mark was formed, a position of the sheer mark was specified visually and with a microscope. Then, the sheet glass materials G were divided at the position of the sheer mark in order to measure the maximum depth of the sheer mark.

Table 2 shows whether or not a sheer mark that originates from the cut mark T which is formed at, the upper part of the gob $G_G$ exists, whether or not a sheer mark that originates from the cut mark T which is formed at the lower part of the gob $G_G$ exists, and measurement results of the maximum depth of the sheer mark.

TABLE 2

|  |  | Example 4 | Example 5 | Example 6 |
| --- | --- | --- | --- | --- |
| Initial angle |  | 15° | 30° | 45° |
| Sheer mark (originating from a cut mark on the upper part) | Exist/ Not exist | Not exist | Not exist | Not exist |
|  | Maximum depth (μm) | — | — | — |
| Sheer mark (originating from a cut mark on the lower part) | Exist/ Not exist | Exist | Exist | Exist |
|  | Maximum depth (μm) | 1.6 | 1.6 | 1.7 |

As shown in Table 2, it was confirmed that a sheer mark that originated from the cut mark T was not formed in the sheet glass materials G according to the Examples 4 to 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A method for manufacturing sheet glass material for a magnetic disk including a pair of principal surfaces, the method comprising:
    performing a dropping process to drop a lump of molten glass in vertically downward direction, the lump being made by cutting molten glass;
    performing a forming process, after beginning the dropping process, to form the sheet glass material by sandwiching substantially simultaneously the lump of molten glass from both sides of a dropping path of the lump with inner surfaces of a pair of dies at a timing as the lump is dropping and when a portion including a cut mark of the lump protrudes from the pair of dies facing together, to press form the lump of molten glass into the sheet glass material; and
    removing the portion of the sheet glass material protruding from the pair of dies while the dies are sandwiching the lump;
    the molten glass being cut in the dropping process such that the lump of molten glass is shorter in a parallel direction to the inner surfaces of the pair of dies than the sheet glass material is after being formed; and
    the lump of molten glass being pressed during the forming process to extend along the inner surfaces of the pair of dies such that the principal surfaces of the sheet glass material have a flatness of 4 μm or less after the removing.

2. The manufacturing method according to claim 1, further comprising
    performing a machining process on the sheet glass material, the machining process including a grinding process for grinding the principal surfaces using fixed abrasive grains, and a polishing process for polishing the principal surfaces using loose abrasive grains, such that total stock removal in the grinding process and the polishing process is 4 μm to 100 μm.

3. The manufacturing method according to claim 1, wherein
    the sheet glass material is formed during the forming process such that an arithmetic average roughness Ra of the principal surfaces of the sheet glass material after forming ranges from 0.01 μm to 10 μm.

4. The manufacturing method according to claim 1, further comprising
    after the removing process, performing a processing operation to modify the sheet glass material into a ring-shape having two concentric circles.

5. A method for manufacturing a sheet glass material for a magnetic disk including a pair of principal surfaces, the method comprising:
    providing molten glass in a vertically downward direction;
    performing a cutting process to move a pair of dies facing together such that upper portions of the pair of dies contact each other and lower portions of the pair of dies do not contact each other to cut the molten glass and to form a lump of molten glass; and
    performing a pressing process to form the sheet glass material by sandwiching the lump of molten glass with inner surfaces of the pair of dies to press form the lump of molten glass while maintaining a condition in which the upper portions of the pair of dies contact each other and lower portions of the pair of dies do not contact each other;
    the molten glass being cut during the providing process such that the lump of molten glass is shorter in a parallel direction to the inner surfaces than the sheet glass material is after being formed; and
    the lump of molten glass being pressed during the pressing process to extend along the inner surfaces of the pair of dies such that the principal surfaces of the sheet glass material have a flatness of 4 μm or less.

6. The manufacturing method according to claim 5, further comprising
    performing a machining process on the sheet glass material, the machining process including a grinding process for grinding the principal surfaces using fixed abrasive grains, and a polishing process for polishing the principal surfaces using loose abrasive grains, such that total stock removal in the grinding process and the polishing process is 4 μm to 100 μm.

7. The manufacturing method according to claim 5, wherein
    the sheet glass material is formed during the pressing process such that arithmetic average roughness Ra of the principal surfaces of the sheet glass material after formed ranges from 0.01 μm to 10 μm.

8. A method for manufacturing a sheet glass material for a magnetic disk including a pair of principal surfaces, the method comprising:
    performing a dropping process to drop a lump of molten glass in a vertical direction, the lump being made by cutting the molten glass; and
    performing a forming process, after beginning the dropping process, to form the sheet glass material by sandwiching the dropping lump of molten glass from both sides of a dropping path of the lump of molten glass with inner surfaces of a pair of dies facing together when a portion including a cut mark of the lump protrudes from the pair of dies, to press form the lump of molten glass into the sheet glass material;
    the molten glass being cut in the dropping process such that the lump of molten glass is shorter in a parallel direction to the inner surfaces of the pair of dies than the sheet glass material is after being formed; and the lump of molten glass being pressed during the forming process to extend along the inner surfaces of the pair of dies such that the principal surfaces of the sheet glass material have a flatness of 4 µm or less after the glass material protruding from the pair of dies is removed.

9. The manufacturing method according to claim 8, further comprising performing a machining process to machine the sheet glass material, the machining processing process including a grinding process for grinding the principal surfaces using fixed abrasive grains, and a polishing process for polishing the principal surfaces using loose abrasive grains, such that total stock removal in the grinding process and the polishing process is 4 µm to 100 µm.

10. The manufacturing method according to claim 8, wherein the sheet glass material is formed during the forming process such that an arithmetic average roughness Ra of the principal surfaces of the sheet glass material after forming ranges from 0.01 µm to 10 µm.

\* \* \* \* \*